United States Patent [19]
Burch

[11] 3,853,075
[45] Dec. 10, 1974

[54] AUTOMATICALLY OPERABLE SELF-LEVELING LOAD TABLE

[75] Inventor: John L. Burch, Decatur, Ala.

[73] Assignee: The United States of America as represented by the Administrator of the National Aeronautics and Space Administration, Washington, D.C.

[22] Filed: Aug. 8, 1973

[21] Appl. No.: 386,790

[52] U.S. Cl. .............................................. 108/136
[51] Int. Cl. ............................................ A47b 9/02
[58] Field of Search ............. 108/136; 182/19, 141; 248/400, 188.3; 269/309; 61/46.5, 65; 114/195, 45, 43.5

[56] References Cited
UNITED STATES PATENTS

| | | | |
|---|---|---|---|
| 2,889,795 | 6/1959 | Parks | 61/46.5 |
| 3,269,685 | 8/1966 | Wallace | 248/371 |
| 3,437,010 | 4/1969 | Jacobi et al. | 248/188.3 |
| 3,516,513 | 6/1970 | Robertson et al. | 248/188.3 |
| 3,688,719 | 9/1972 | Amirikian | 114/45 |

*Primary Examiner*—Paul R. Gilliam
*Assistant Examiner*—Darrell Marquette
*Attorney, Agent, or Firm*—Wayland H. Riggins; L. D. Wofford, Jr.; John R. Manning

[57] ABSTRACT

A self-leveling load table which is automatically maintained level by selectively opening and closing a plurality of solenoid valves for inserting and removing air from chambers provided under the table. The table is floated in a fluid by nine air chambers beneath the top of the table. These chambers are open at the bottom and four oppositely located chambers are used for leveling the table by having the air contained therein, increased or decreased by means of a flexible hose extending thereto. Air bearing pendulums are used for selectively energizing solenoid valves which either apply pressurized air to the chamber or evacuate air from the chamber by means of a vacuum source.

7 Claims, 10 Drawing Figures

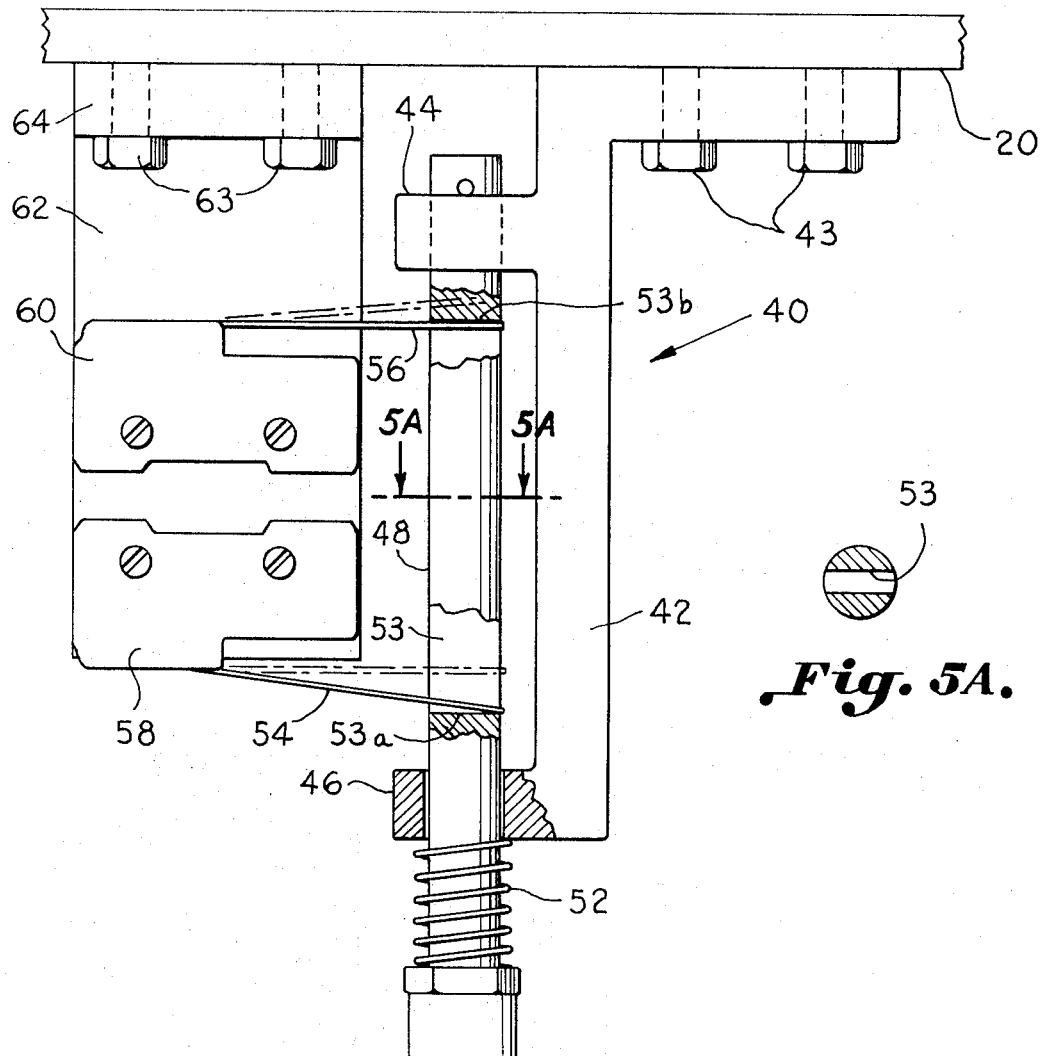
Fig.5.
Fig.5A.
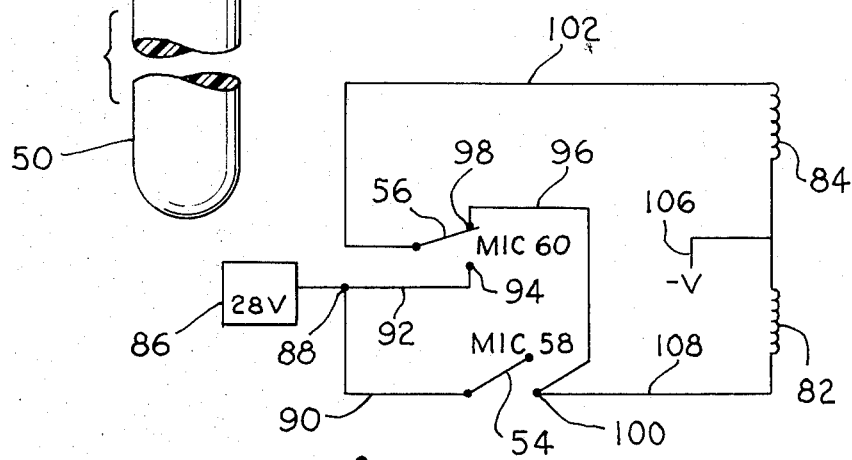
Fig.6.

AUTOMATICALLY OPERABLE SELF-LEVELING LOAD TABLE

ORIGIN OF THE INVENTION

The invention described herein, was made by an employee of the United States Government, and may be manufactured or used by or for the Government for governmental purposes without the payment of any royalties thereon or therefor.

BACKGROUND OF THE INVENTION

This invention relates to a load table, and more particularly to an automatically operable self-leveling load table.

In order to simulate outer space conditions it is important to have a load table which is allowed to float with a minimum amount of frictional contact. On this load table equipment can be positioned and maneuvered to simulate docking in outer space. In order to simulate such docking it is important that the load table be maintained level and not be affected by external vibrations and uneven heating caused by either the position of the sun or manmade heat sources. While these conditions would appear to be very insignificant, it is important that the air bearing table upon which the elements are being tested be extremely accurate as to being level. The surface of the table should also be polished so as to minimize frictional contact between the elements being carried thereon and the table. In one particular test one of the elements was static, while the other element was allowed to travel on an air bearing set up between the element and the table. The purpose of this test was to simulate docking procedures between various space vehicles.

While mechanical tables have been utilized in the past, they have not proven to be completely satisfactory in that they are very heavy and bulky with many discretely located leveling legs positioned thereunder. It is very difficult to manipulate these legs for maintaining an accurately level table under changing environmental conditions. Furthermore, due to stresses, surface waves develop requiring the tables to be leveled at least once a week. These tables are also sensitive to subteranean shocks and require expensive, substructure and subflooring.

SUMMARY OF THE INVENTION

The invention includes a table which is floated in fluid by trapping air beneath the surface of the table in chambers. While there may be many chambers under the table, normally only four oppositely located chambers are used for leveling the table by having the air trapped therein, either be increased or decreased by means of a single flexible hose extending to each chamber. Leveling devices are positioned on the table at right angles to each other for generating signals indicating the particular direction that the table is out of level. These signals are used for selectively energizing solenoid valves which, in turn, allow pressurized air to be applied to a particular chamber for correcting the out of level condition.

Also, provided in the table is a depth gauge which generates a signal when the table either is immersed too deep or rises too high in the tank. These signals are applied to solenoid valves for either supplying air to the chambers for correcting the condition, or supplying a vacuum for evacuating air from the chambers. The depth sensing device, as well as the air bearing pendulums all operate automatically, therefore the table is maintained level at all times.

Accordingly, it is a general object of the present invention to provide an automatically operable self-leveling high precision load table.

Another important object of the present invention is to provide a relatively light-weight load table that is susceptible to minimum of distortions and subterranean shocks.

Still another important object of the present invention is to provide a self-leveling load table that corrects out of level conditions automatically and rapidly.

Another important object of the present invention is to provide a high precision self-leveling load table that does not require special sub-flooring or buildings for accommodating such.

These and other objects and advantages of the invention will become apparent upon reference to the following specification, attendant claims and drawings.

BRIEF DESCRIPTION OF THE DRAWINGS

FIG. 5 is a side elevational view, partially in sections, illustrating a depth gauge mounted on the bottom of the table, FIG. 5a is a sectional view, taken along line 5a—5a of FIG. 5, FIG. 6 is a schematic diagram showing an electrical circuit and solenoids activated by the depth gauge of FIG. 5.

DESCRIPTION OF THE PREFERRED EMBODIMENT

Figure 1:
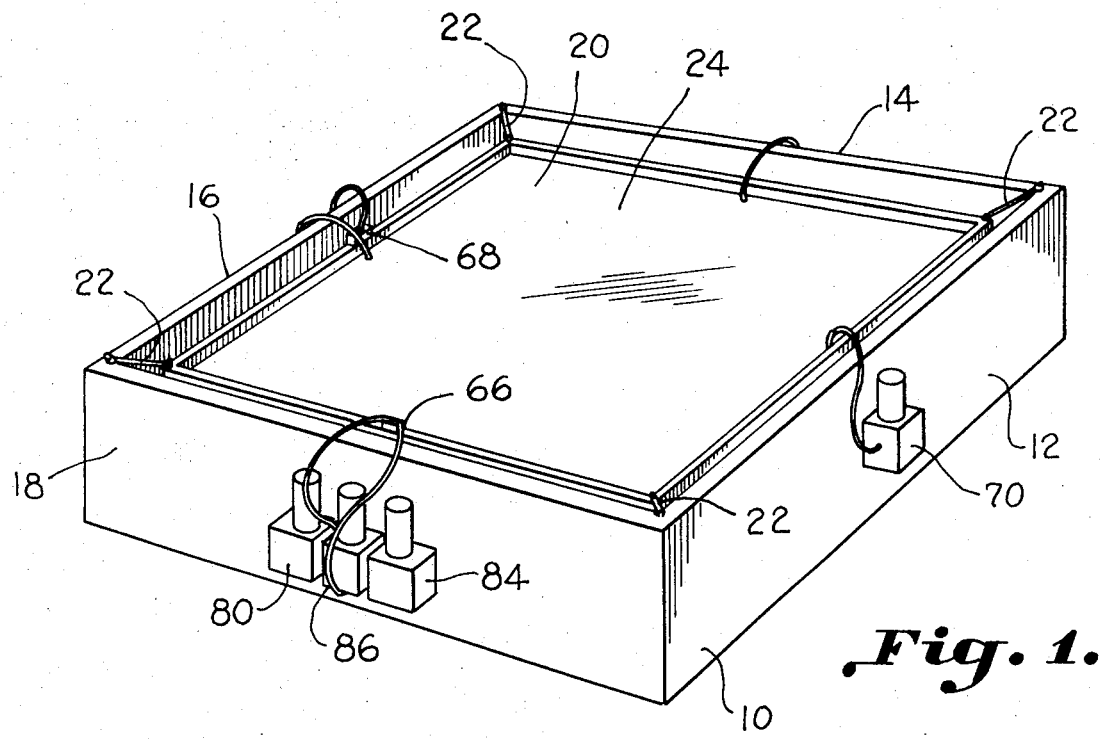
FIG. 1 is a perspective view illustrating a self-leveling load table constructed in accordance with the present invention.
Figure 2:
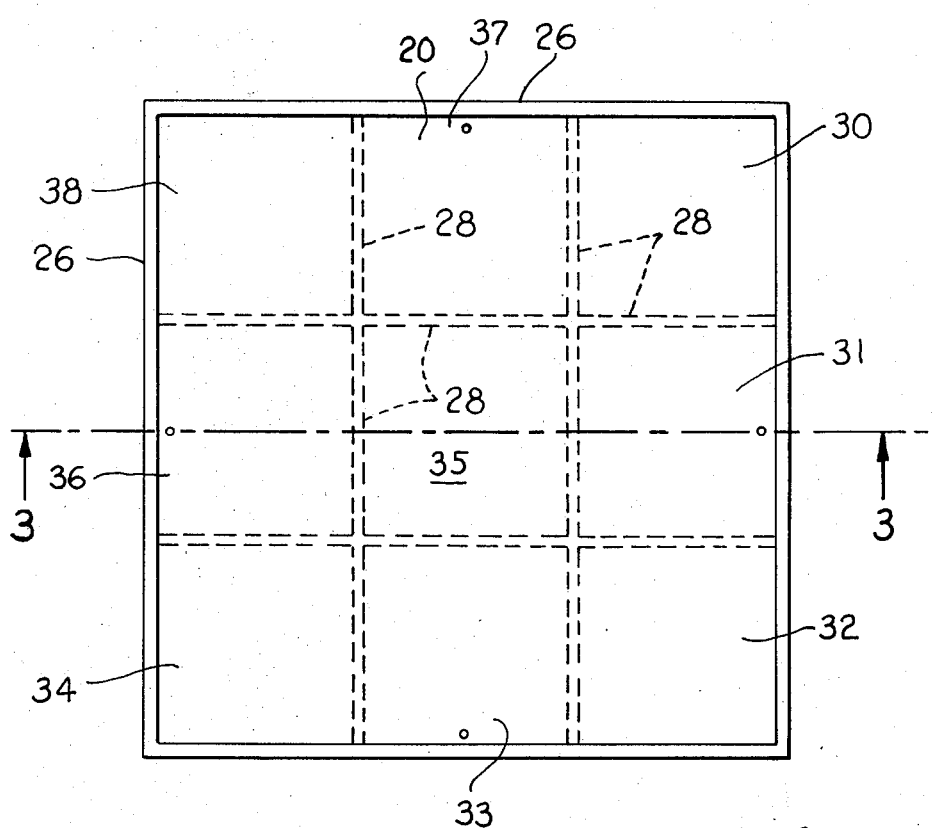
FIG. 2 is a plan view of the table showing in dotted lines, the location of the partitions extending between the side walls for dividing the bottom of the table into chambers.
Figure 3:
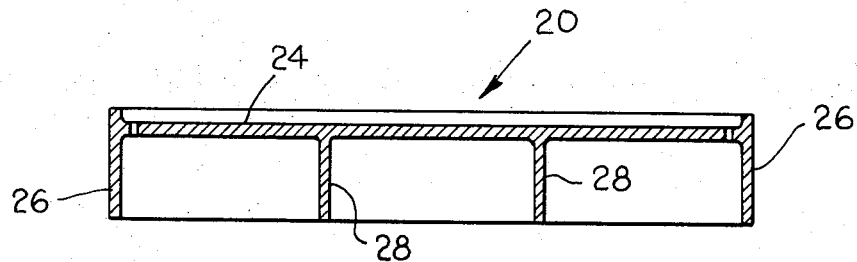
FIG. 3 is a sectional view, taken along lines 3—3 of FIG. 2.

Referring in more detail to FIGS. 1 through 3 of the drawings, there is illustrated a square tank 10 having vertical side walls 12, 14, 16 and 18, which are joined by a bottom, not shown. Floated on a liquid medium, such as water within tank 10 is a table 20 which is also square and of slightly smaller dimensions than the tank 10 so as to provide space therebetween. In order to prevent the square table 20 from shifting or tending to rotate within the tank 10, rubber bands 22 extend from the corners of the tank 10 to the corners of the table 20. It is desirable that these rubber bands be relatively small so as not to adversely affect the leveling of the table 20.

The table has a flat upper planar surface 24 with downwardly extending side walls 26 extending there-around. Crossing divider partitions 28 extend downwardly from the bottom of the planar surface 24 for dividing the bottom of the table 20 into nine distinct square compartments or chambers 30 through 38. While these compartments are open at the bottom, they are sealed by the partitions 28 from each other. A liquid medium, such as water, is carried in the tank 10 and when the table 20 is placed therein, air trapped within the chambers 30 through 38 supports the table in the liquid medium. By controlling the air within the various chambers, and particularly in chambers 31, 33, 36 and 37, the table can be maintained level.

A depth switch 40 is centrally located on the bottom side of the table 20 for generating a signal when the table is immersed too deep within the liquid medium or rises too high within the tank. The depth gauge 40 includes an L-shaped bracket 42 which is bolted by bolts 43 to the center of the bottom side of the table 20. Extending through holes carried in outwardly extending vertically spaced arms 44 and 46 is a vertical plunger 48. The arms 44 and 46 are integral with the L-shaped bracket 42. The plunger 48 is rod-shaped, and has a rounded Teflon tip 50 carried on the bottom thereof. Positioned between the Teflon tip 50 and the arm 46 is a compression spring 52, which tends to hold the rod 48 in an extended position.

The rod 48 has an elongated vertical slot 53 extending from a lower end 53a to an upper end 53b. Control contact arms 54 and 56 of microswitches 58 and 60 are carried in the slot 53.

The microswitches 58 and 60 are, in turn, supported on a bracket 62 which is bolted by means of bolts 63 extending through a flange 64 to the bottom surface of the table 20. The contact arms 54 and 56 of the microswitches 58 and 60 are positioned in the slot 53 so that, if the table is immersed too deep within the tank 10 the tip 50 carried on the bottom of the rod 48 will push the rod up closing microswitch 58. When microswitch 58 is closed air is allowed to flow into chambers 31, 33, 36 and 37. The details of the air flow will be described more fully in connection with the discussion of FIG. 4. If the table rises too high in the tank, as a result of too much air being in the chambers 31 through 37, then the spring 52 causes rod 48 to be extended opening microswitch 58 and closing microswitch 60 by allowing the contact arm 56 to be pulled downwardly to the full-line position illustrated in FIG. 5. When microswitch 60 is closed air is evacuated from the four chambers 31, 33, 36 and 37 permitting the table 20 to be lowered to the desired height. When the table reaches the desired height within the tank 10 neither microswitch 58 nor 60 is energized. The length of the slot 53 within the rod 48 controls the opening and closing of the microswitches 58 and 60.

Figure 4:
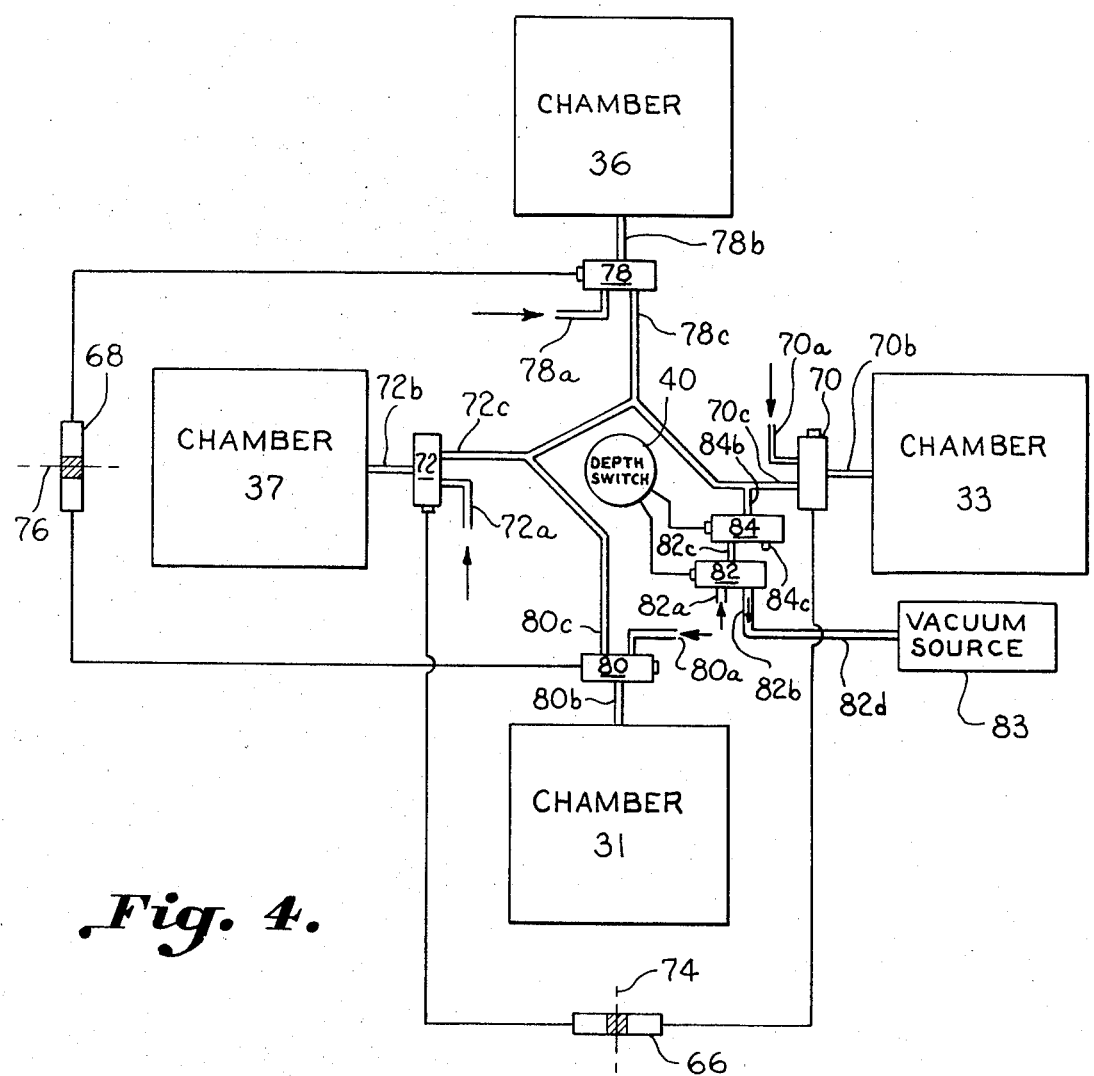
FIG. 4 is a flow diagram for the air and vacuum being fed to the chambers used in leveling the table.

Referring now to FIGS. 1 and 4 of the drawings, it can be seen that two air bearing pendulums 66 and 68 are positioned perpendicular to each other on a horizontal plane in the center of two adjacent sides of the table 20. By positioning the air bearing pendulums 66 and 68 in this manner they sense the movement or unbalance condition of the table in the four quadrants. Therefore, if the table tilts from the horizontal in any direction, at least one of the air pendulums 66 or 68 will be activated. The air bearing pendulum 66 is electrically connected to two solenoids 70 and 72 for selectively activating these solenoids responsive to tilting of the table about the axis 74 shown in dotted lines extending through the pendulum 66.

The air bearing pendulum 68 is provided for energizing solenoid valves 78 and 80 when the table 20 tilts about the axis table shown in dotted lines, extending through air bearing pendulum 68. Solenoid valves 82 and 84 are activated by the depth switch 40 closing either the microswitch 58 or 60. A vacuum hose 82d is coupled between port 82b and a vacuum source 83 for exhausting air from the chambers 31, 33, 36 and 37 when the microswitch 60 is energized indicating that the table 20 has risen too high in the tank 10.

Connected to port 82a of the solenoid valve 82 is a pressurized source of air (not shown). This pressurized source of air is also coupled to ports 80a of solenoid valve 80, 72a of solenoid valve 72, 78a of solenoid valve 78 and 70a of solenoid valve 70. The output port of solenoid valve 80 is fed by a thin flexible hose 80b to chamber 31 for either adding or taking air therefrom. The output of solenoid valve 72 is coupled through a hose 72b to chamber 37 for controlling the amount of air therein. The output of solenoid valve 78 is connected through hose 78b to chamber 36 and the output of solenoid valve 70 is connected through a flexible hose 70b to chamber 33. It is noted that the output 82c of solenoid valve 82 is connected to an input port of solenoid valve 84. Solenoid valve 84 is connected through hose 84b to input ports 70c, 78c, 72c and 80c of solenoid valves 70, 78, 72 and 80, respectively. An exhaust port 84c of solenoid valve 84 is sealed.

In operation, regarding particularly the flow of air to and from chambers 31, 33, 36 and 37, first the operation of the depth gauge 40 will be described. After the table 20 has been placed in the tank 10, if the table is floating too low within the tank 10, microswitch 58 will be closed by means of the tip 50 of the rod 46 engaging the bottom of the tank. This causes contact arm 54 to be raised to the dotted line position shown in FIG. 5. When microswitch 58 is closed both solenoids 82 and 84 are energized. When solenoids 82 and 84 are energized air is allowed to flow from any suitable source of pressurized air through the input port 82a of solenoid valve 82, port 82c through solenoid valve 84 to each of the input ports 70c, 78c, 72c and 80c of the solenoid valves 70, 78, 72 and 80, respectively, into chambers 33, 36, 37 and 31 to raise the level of the table. When the solenoid valves are in this condition the ports 82b, 70a, 78a, 72a and 80a of the solenoid valves 82, 70, 78, 72 and 80, respectively, are closed. Air is allowed to flow into chambers 33, 36, 37 and 31 until the level of the table rises sufficiently to allow contact arm 54 to open the microswitch 58. In this equilibrium position air ceases to flow through all of the solenoid valves as a result of solenoid valves 82 and 84 becoming de-energized.

If the table 20 is floating too high, then microswitch 60 is energized. When microswitch 60 is energized such causes solenoid 84 to be energized. In this condition solenoid 82 is de-energized. When solenoid 82 is de-energized and solenoid valve 84 is energized a vacuum is applied to port 82b by the vacuum source 83 for withdrawing air through port 82c, solenoid valve 84, port 84b which is coupled through each of the solenoids 70, 78, 72 and 80 to chambers 31, 33, 36 and 37, respectively. Air is exhausted from these chambers until an equilibrium condition is reached wherein both microswitches 58 and 60 are de-energized. When both microswitches 58 and 60 are de-energized solenoid valve 84 assumes a position wherein, air flow either caused by the pressurized source of air, or by the vacuum source 83 is prevented from flowing therethrough. Therefore, it can be seen that the primary purpose of the depth switch 40 is to control the depth that the table 20 floats within the liquid medium in tank 10.

If the table tends to tilt, for example, about an axis 74 so that the level of chamber 33 drops the air bearing pendulum 66 will generate a signal which will cause solenoid valve 70 to be energized. When solenoid valve 70 is energized pressurized air flows from any suitable source of pressurized air through input port 70a, solenoid valve 70, into chamber 33 to raise that side of the table. If, for example, the depth switch were activated by the table rising on a tilt, wherein, chamber 37 would be above a predetermined level and chamber 33 would be below a predetermined level, then microswitch 60 would cause solenoid valve 84 to be energized to exhaust air through solenoid valve 78, 72 and 80 to lower that side of the table while air is being fed through solenoid valve 70 to chamber 33 for raising the other side. Normally, however, the tilting of the table is such that air is supplied to two of the chambers while vacuum is being supplied to the remaining chambers. The circuit operating the flow of air in vacuum to the chambers is sensitive enough that such operation takes place smoothly.

Referring to FIG. 6 of the drawings, there is illustrated schematically the electrical circuit for operating the solenoid valves 82 and 84. A 28 D.C. volt source 86 is applied to junction 88. Connected to junction 88 is lead 90 which is coupled to contact arm 54 of the microswitch 58. Also, connected to junction 88 is a lead 92 which is coupled to the contact terminal 94 forming part of microswitch 60. A lead 96 extends from a terminal 98 forming part of microswitch 60 to a terminal 100 forming part of microswitch 58. Extending from the movable contact 56 is a lead 102 which is coupled directly to one side of solenoid valve 84. The other side of solenoid valve 84 is connected to a negative voltage 106 for completing the circuit. Also, connected to the negative source 106 is one side of solenoid valve 82. The other side of solenoid valve 82 is connected by means of lead 108 to contact terminal 100 of microswitch 58. The movable arms 54 and 56 of microswitches 58 and 60 are shown in FIG. 6 in the de-energized state.

In describing the operation of the circuit of FIG. 6, if the movable arm 54 of microswitch 58 is brought into contact with terminal 100 by means of the tip of the rod 48 of the depth gauge 40 being pushed upwardly, then current flows from the source 86 through microswitch 54 to energize solenoid valve 82. It, also, flows through lead 96, movable arm 56 of microswitch 60, and lead 102 to solenoid valve 84. Now when the table 20 rises too high in the tank contact arm 56 is shifted from terminal 98 to 94. In this position current flows from the voltage source 86 through contact arm 56 for energizing solenoid valve 84. It is noted that solenoid valve 82 remains de-energized as a result of the open circuit produced by contact arm 54 of microswitch 58.

Figure 7:
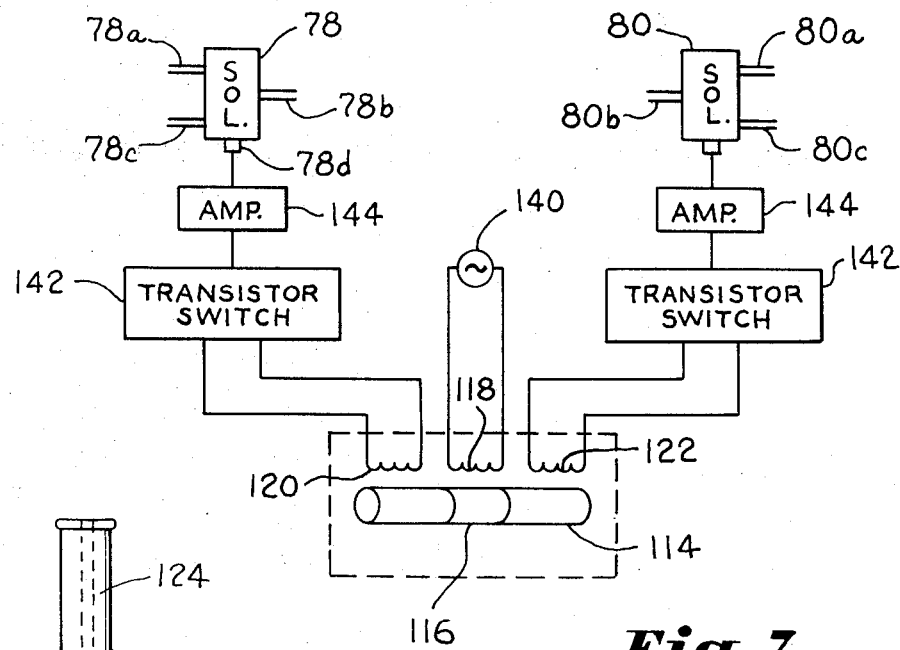
FIG. 7 is a schematic diagram showing one air bearing leveling device used for controlling the flow of air to two of the solenoids.
Figure 8:
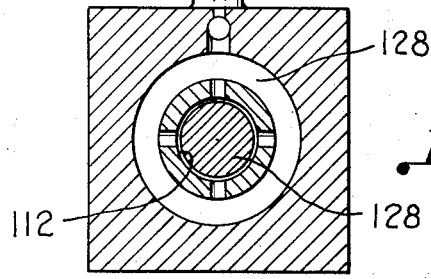
FIG. 8 is a sectional view taken along line 8—8 of FIG. 9.
Figure 9:
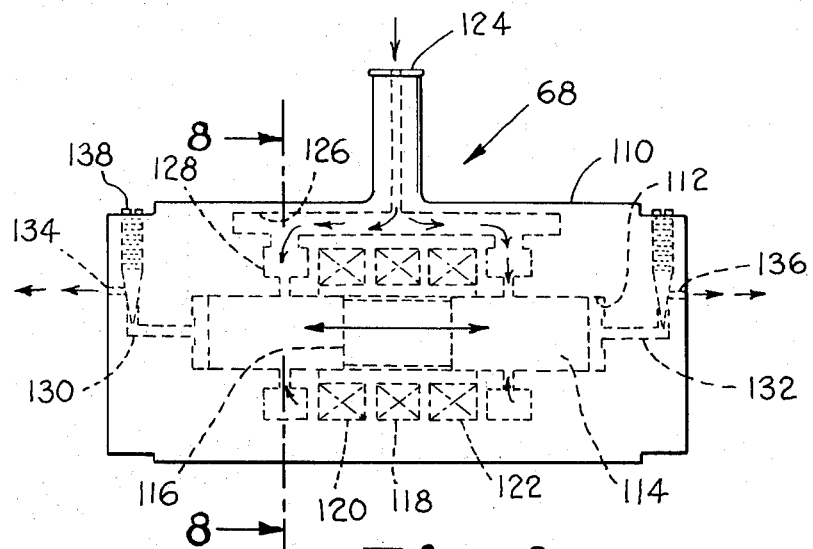
FIG. 9 is a side elevational view, of an air bearing leveling device with portions shown in dotted lines.

Referring in more detail to FIGS. 7, 8 and 9, there is illustrated an air bearing pendulum 68, which includes a cylindrical housing 110, which has a cylindrical bore 112 along its longitudinal axis. It is to be understood that any suitable conventional air bearing pendulum could be used. Positioned in the bore 112 is a movable cylinder 114 which has a sleeve 116 positioned thereon, which controls the electrical coupling between a central coil 118 and output coils 120 and 122 positioned on opposite sides thereof. In order to minimize the frictional contact between they cylinder 114 and the longitudinal bore 112 pressurized air is inserted through a tubular member 124 through passages 126 and 128. The air flows out opposite ends of the bore 112 longitudinal passages 130 and 132, through vent holes 134 and 136.

An adjustable needle 138 is provided for controlling the flow of air through the vent holes 134 and 136 for adjusting the cushioning provided by the flow of air through the air bearing pendulum 68. The central coil 118 is coupled to any suitable source of A.C. voltage, such as shown by reference character 140. Each of the output coils 120 and 122 is connected through a transistor switching circuit 142, amplifier 144 to a solenoid valve.

In operation when the air bearing pendulum is in a level position the sleeve 116 is positioned directly under the input coil 118. In this condition insufficient voltage is coupled between the input coil 118 and either of the output coils 120 or 122 to activate the transistor switch 142. If, however, the table 20 tilts, the cylinder 114 slides on a cushion of air in a downward direction so that the sleeve 116 provides sufficient coupling between the input coil 118 and, for example, output coil 120. This voltage is sufficient to activate the transistor switch 142 which produces a signal that is amplified by the amplifier 144 and fed to control contact 78d to energize the appropriate solenoid valve, in this case 78.

When the air bearing pendulum 68 tilts in the opposite direction the solenoid 80 will be energized. Thus, by positioning a pair of air bearing pendulums in the center of adjacent sides of the table 20, at least one solenoid valve will be energized when such becomes out of level.

While a preferred embodiment of the invention has been described using specific terms, such description is for illustrative purposes only, and it is to be understood that changes and variations may be made without departing from the spirit or scope of the following claims.

What is claimed is:

1. A self-leveling load table comprising:
   a. a tank;
   b. a liquid medium carried in said tank;
   c. a table having a smooth planar top, side walls extending downwardly from said planar top defining a cavity therebetween, and partitions extending between said side walls defining sealed chambers having opened bottoms;
   d. said table being disposed in said liquid medium carried in said tank trapping air in said chambers so as to provide buoyancy thereto;
   e. a plurality of solenoid valves having an air inlet port, an air outlet port, and a control contact;
   f. means for coupling said air outlet ports of said solenoid valves to predetermined chambers;
   g. a level sensing means coupled to said control contacts of said solenoid valves for selectively energizing said solenoid valves responsive to said table being out of level;
   h. a source of pressurized air; and i. means for supplying pressurized air from said source through said energized solenoid valves to said chambers connected thereto for maintaining said table level.

2. The self-leveling load table as set forth in claim 1 wherein:
a. there are at least four chambers circumferentially and equally spaced around the center of said table.

3. The self-leveling load table as set forth in claim 2 wherein:
a. said table has four perpendicular sides;
b. said level sensing means includes at least two air bearing pendulums positioned perpendicular to each other on a horizontal plane adjacent the center of two adjacent sides of said table;
c. means included in said air bearing pendulums for generating electrical signals indicating the plane said table is out of level; and
d. means for coupling said signals from said air bearing pendulums to control contacts of said solenoid valves for selectively energizing said solenoid valves responsive to said table being out of level.

4. The self-leveling load table as set forth in claim 1 further comprising:
a. a depth gauge carried adjacent the center of said table extending downwardly for engaging the bottom of said tank when said table is immersed beyond a predetermined level in said tank;
b. means activated by said depth gauge generating an electrical signal when said table is immersed beyond said predetermined level, and
c. means for supplying pressurized air to said chambers responsive to receiving said electrical signal for raising said table.

5. The apparatus as set forth in claim 4, further comprising:
a. a vacuum source,
b. means coupled to said depth gauge for generating an electrical signal when said table rises above a predetermined level in said tank; and
c. means for coupling said vacuum source through said solenoid valves to said chambers for removing air from said compartments responsive to said electrical signal.

6. A self-leveling load table comprising:
a. a tank;
b. a liquid medium carried in said tank;
c. a table having a smooth planar top, side walls extending downwardly from said planar top defining a cavity therebetween, and partitions extending between said side walls defining at least four sealed chambers circumferentially and equally spaced around the center of said table and having opened bottoms;
d. said table being disposed in said liquid medium carried in said tank trapping air in said chambers so as to provide buoyancy thereto;
e. a plurality of solenoid valves having an air inlet port, and air outlet port, and a control contact;
f. means for coupling said air outlet ports of said solenoid valves to predetermined chambers;
g. said table having four perpendicular sides;
h. at least two air bearing pendulums positioned perpendicular to each other on a horizontal plane adjacent the center of two adjacent sides of said table;
i. means included in said air bearing pendulums for generating electrical signals indicating the plane said table is out of level;
j. means for coupling said signals from said air bearing pendulums to control contacts of said solenoid valves for selectively energizing said solenoid valves responsive to said table being out of level;
k. a source of pressurized air;
l. means for supplying pressurized air from said source through said energized solenoid valves to said chambers connected thereto for maintaining said table level;
m. a depth gauge carried adjacent the center of said table extending downwardly for engaging the bottom of said tank when said table is immersed beyond a predetermined level in said tank;
n. means activated by said depth gauge generating an electrical signal when said table is immersed beyond said predetermined level; and
o. means for supplying pressurized air to said chambers responsive to receiving said electrical signal for raising said table.

7. The apparatus as set forth in claim 6, further comprising:
a. a vacuum source;
b. means coupled to said depth gauge for generating an electrical signal when said table rises above a predetermined level in said tank; and
c. means for coupling said vacuum source through said solenoid valves to said chambers for removing air from said chambers responsive to said electrical signal.

* * * * *